United States Patent

Millas

Patent Number: 6,096,121
Date of Patent: Aug. 1, 2000

[54] SEAL JOINT FOR MULTIPLE INTERNAL SEPARATOR ARRANGEMENT

[75] Inventor: George S. Millas, Houston, Tex.

[73] Assignee: Hudson Products Corporation, Houston, Tex.

[21] Appl. No.: 09/250,081

[22] Filed: Feb. 15, 1999

[51] Int. Cl.[7] .................................................. B01D 45/12
[52] U.S. Cl. ..................... 96/208; 55/459.4; 277/616; 285/189; 285/206; 285/412
[58] Field of Search .................... 55/447, 459.1, 55/459.4; 96/208, 209, 216; 285/405, 410, 412, 195, 189, 212, 219, 220, 206; 277/616

[56] References Cited

U.S. PATENT DOCUMENTS

| | | | |
|---|---|---|---|
| 664,218 | 12/1900 | Kaeferle | 285/412 |
| 1,509,562 | 9/1924 | MacGregor | 285/412 |
| 1,859,010 | 5/1932 | Stratford | 55/459.4 |
| 1,863,111 | 6/1932 | Greve | 96/216 |
| 2,241,311 | 5/1941 | Lewis | 285/412 |
| 2,528,343 | 10/1950 | Davis | 285/412 |
| 2,617,672 | 11/1952 | Nichols | 285/412 |
| 2,764,266 | 9/1956 | Haworth | 285/412 |
| 2,811,219 | 10/1957 | Wenzl | 96/209 |
| 2,840,240 | 6/1958 | Snyder | 55/459.1 |
| 3,088,758 | 5/1963 | Chilton | 285/412 |
| 3,243,941 | 4/1966 | Peterson | 96/209 |
| 3,276,592 | 10/1966 | Neuman | 55/459.4 |
| 4,105,227 | 8/1978 | Ekberg et al. | 277/616 |
| 5,056,801 | 10/1991 | Beadle | 277/616 |
| 5,558,344 | 9/1996 | Kestly et al. | 277/616 |

Primary Examiner—Duane S. Smith
Attorney, Agent, or Firm—R. J. Edwards; Eric Marich; R. C. Baraona

[57] ABSTRACT

A seal joint is for an arrangement for separating a gas and liquid mixture having a vessel with an inlet for entry of the gas and liquid mixture and an outlet for exit of a separated gas, and a centrifugal separation cyclone in the vessel for centrifugally separating the gas from the mixture. The joint requires the vessel to have an internal vessel flange defining a flange opening. An inlet tube extends into the flange opening. A first retaining ring having a first outer ring which engages the flange, also has a first inner ring portion extending around the inlet tube in the flange opening. A second retaining ring has a second outer ring engaged with the flange and a second inner ring extending around the inlet tube in the flange opening. An O-ring is engaged around the inlet tube and between the first and second inner rings and fastening bolts are use for fastening the first and second outer rings to the flange, around the flange opening for deforming the O-ring against the inlet tube.

5 Claims, 1 Drawing Sheet

SEAL JOINT FOR MULTIPLE INTERNAL SEPARATOR ARRANGEMENT

FIELD AND BACKGROUND OF THE INVENTION

The present invention relates, in general, to separation systems and, in particular, to a new and useful seal joint for a separator for separating a multiple phase mixture into separate vapor and liquid phases utilizing pairs of centrifugal cyclone separators.

Most of the known gas/oil separation systems rely on natural or gravity separation which requires large vessels to achieve the desired separation performance. When natural separation is used in a relatively small vessel, the throughput or vapor flux of that system is significantly smaller when compared to other systems not relying on natural separation. An example of a system which uses natural separation is described in U.S. Pat. No. 4,982,794.

One known separation system is disclosed in U.K. Patent Application No. GB 2 203 062A and uses centrifugal separation for a primary separation stage and inertial separation (i.e., scrubbers) for a second stage of separation. Although this system most likely has higher separation capacities than a system relying on natural separation, it most likely has less capacity when compared to a system that could employ centrifugal separation for both stages.

U.S. patent application Ser. No. 08/337,359, filed Nov. 10, 1994, abandoned in favor of Continuation U.S. patent application Ser. No. 08/695,947, filed Aug. 13, 1996, the text of which are hereby incorporated by reference as though fully set forth herein, to disclose an improved separator which uses centrifugal separation modules for the primary and secondary stages of separation.

SUMMARY OF THE INVENTION

An object of the present invention is to provide a seal joint which is particularly useful for connecting an inlet or other tube of a module in the separator, to an internal flange in the separator vessel.

Accordingly, a further object of the invention is to provide an arrangement for separating a gas and liquid mixture, the arrangement having a vessel with an inlet for entry of the gas and liquid mixture and an outlet for exit of a separated gas, and centrifugal separation means in the vessel for centrifugally separating the gas from the mixture; the improvement comprising: the vessel including an internal vessel flange defining a flange opening; an inlet tube extending into the flange opening; a first retaining ring having a first outer ring engaged with the flange and a first inner ring extending around the inlet tube in the flange opening; a second retaining ring having a second outer ring engaged with the flange and a second inner ring extending around the inlet tube in the flange opening; an O-ring engaged around the inlet tube and between the first and second inner rings; and fastening means for fastening the first and second outer rings to the flange, around the flange opening for deforming the O-ring against the inlet tube.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
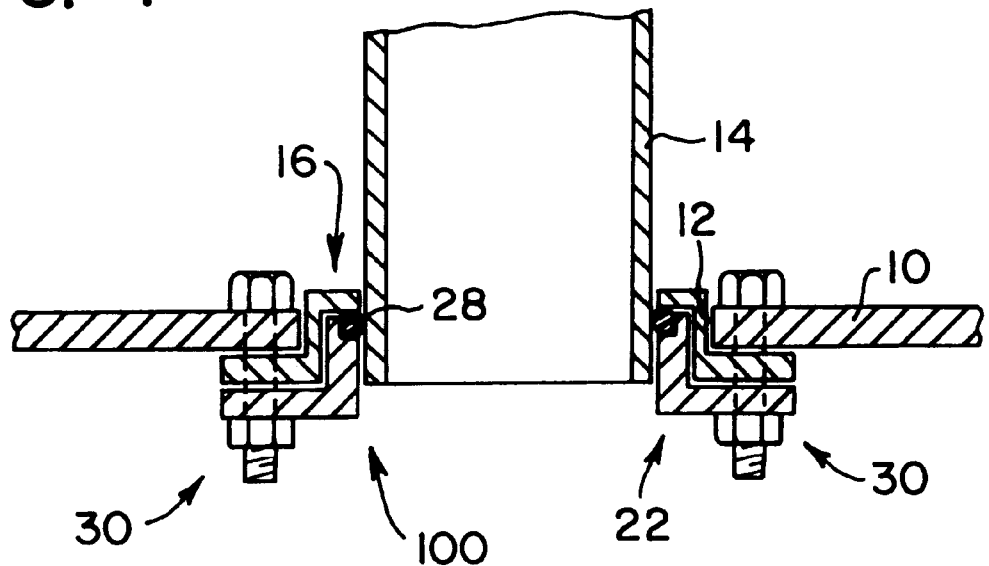
FIG. 1 is a sectional view of a seal joint according to the present invention between an inlet tube and an internal flange of a separator vessel.

Referring to the drawings in particular, the invention in FIG. 1 comprises a seal joint generally designated 100 for sealing an inlet or other pipe 14 to an internal flange 10 of a gas/liquid separator having an internal wall carrying flange 10, in a flange opening 12. The invention provides for giving manufacturing tolerances, ease of assembly at minimal cost and without introducing any flow restrictions into the flow of fluid through the pipe 14.

The seal joint of the present invention is used in a vessel of a gas/liquid separator having an inlet for the entry of gas and liquid mixtures, and an outlet for exiting separated gas. One or more centrifugal separation means such as staged cyclone separators of known design are provided in the vessel for separating gas from the mixture.

The improved seal joint of the present invention utilizes an upper or first retaining ring generally designated 16 having a first outer ring or ring portion 18 engaged with the flange 10, and a first inner ring or ring portion 20, engageable around the lower end of inlet tube 14.

Seal joint 100 also includes a lower or second retaining ring 22 which has a second outer ring 24 engaged with the flange, and a second inner ring 26 engaged around the inlet. Fastening means, in the form of a plurality of hold-down nut and bolt combinations 30, extends through aligned apertures in the upper and lower rings and in the flange, to squeeze rings to each other and to the flange. An O-ring 28, made of suitable yet resilient material such as high temperature resistant polymer, is held in an upper step 32 on an upper inner surface of second inner ring 26. A lower surface of first inner ring 20 bears down on the O-ring, and when the rings are squeezed against each other, deforms the O-ring against the outer circumference of tube 14, establishing the seal.

Each hold-down bolt combination includes a bolt 34 having a threaded shaft for extending through aligned apertures in the flange and rings, and a nut 36 for engaging the threaded shaft.

Figure 2:
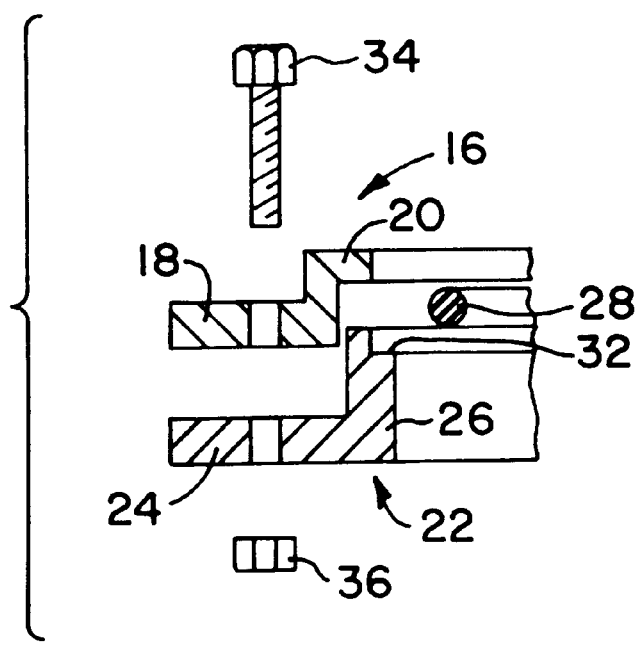
FIG. 2 is a fragmentary enlarged and exploded view of the seal joint elements.

Upper or first retaining ring 20 has an S-shaped cross-section with first inner and outer rings 18,20 which are parallel to each other but offset in the axial direction of the flange opening 12. Second or lower retaining ring 22 has an L-shaped cross-section, as shown in FIG. 2.

Standard off the shelf parts can be used to manufacture the upper and lower rings, as well as the fasteners, and assembly of the seal joint is possible from the bottom of the wall carrying flange 10, an easily accessible location. This also allows for visual inspection of the joint and also places the joint outside of the flow path of fluid passing through the tube.

While a specific embodiment of the invention has been shown and described in detail to illustrate the application of the principles of the invention, it will be understood that the is invention may be embodied otherwise without departing from such principles.

What is claimed is:

1. In an arrangement for separating a gas and liquid mixture, the arrangement having a vessel with an inlet for entry of the gas and liquid mixture and an outlet for exit of a separated gas, and centrifugal separation means in the vessel for centrifugally separating the gas from the mixture; the improvement comprising:

the vessel including an internal vessel flange (10) defining a flange opening (12);

an inlet tube (14) extending into the flange opening;

a first retaining ring (16) having a first outer ring (18) engaged with the flange and a first inner ring (20) extending around the inlet tube in the flange opening;

a second retaining ring (22) having a second outer ring (24) engaged with the flange and a second inner ring (26) extending around the inlet tube in the flange opening;

an O-ring (28) engaged around the inlet tube and between the first and second inner rings; and fastening means (30) for fastening the first and second outer rings to the flange, around the flange opening for deforming the O-ring against the inlet tube.

2. The improvement of claim 1, wherein the fastening means comprises a plurality of hold-down bolts spaced around the flange opening and extending through the first and second retaining rings.

3. The improvement of claim 1, wherein the second retaining ring includes an inner upper step in the second inner ring thereof for receiving the O-ring, the O-ring being compressed between the step and a lower surface of the first inner ring.

4. The improvement of claim 3, wherein the first inner and outer rings are parallel to each other and offset in an axial direction of the flange opening and the second retaining ring has an L-shaped cross-section.

5. The improvement of claim 4, wherein the first retaining ring has an S-shaped cross-section.

* * * * *